No. 687,290. Patented Nov. 26, 1901.
W. TRAFFORD.
DISTANCE REGISTERING AND TIME RECORDING INSTRUMENT.
Application filed Nov. 23, 1895. Renewed Apr. 27, 1901.)
(No Model.) 2 Sheets—Sheet 1.
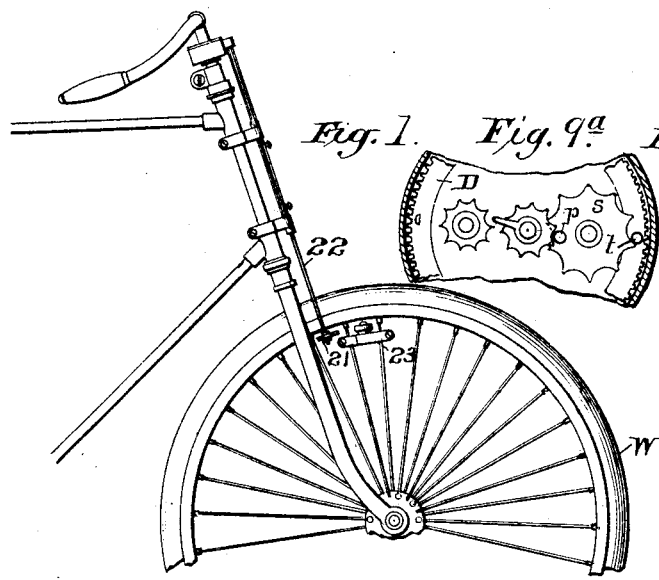
Fig. 1. Fig. 9a.
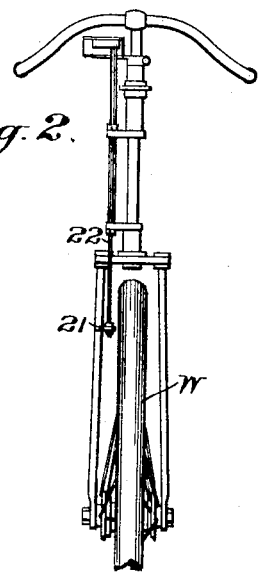
Fig. 2.
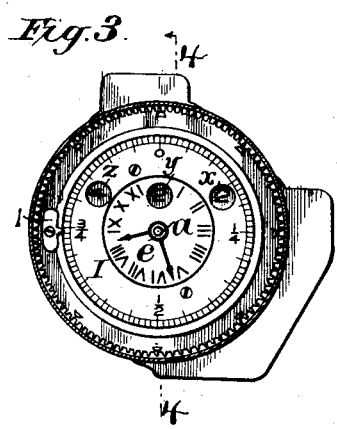
Fig. 3.
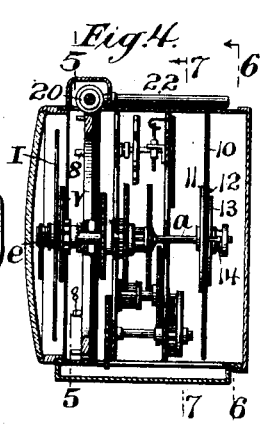
Fig. 4.
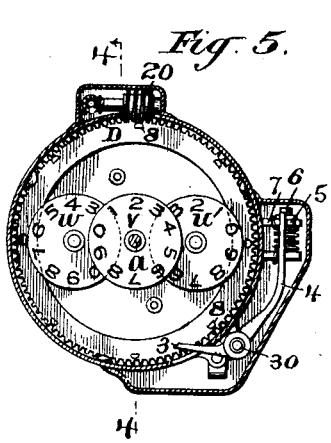
Fig. 5.
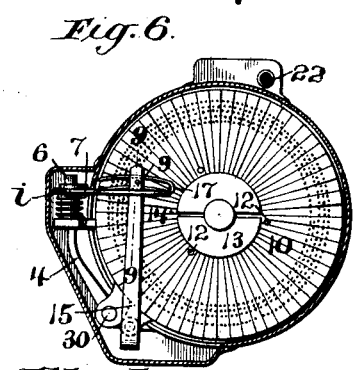
Fig. 6.
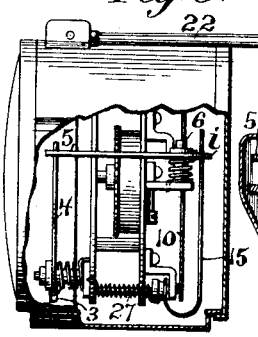
Fig. 8.
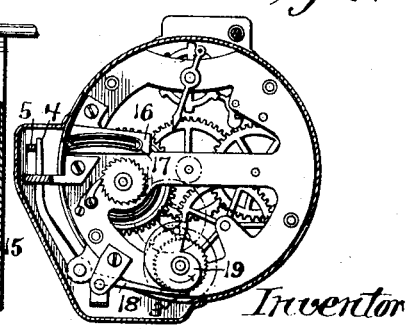
Fig. 7.
Fig. 9.
Attest:
George H. Pitts
T. F. Kehoe
Inventor
Wesley Trafford
by Philipp Munson & Phelps,
Attys
THE NORRIS PETERS CO., PHOTO-LITHO., WASHINGTON, D. C.

No. 687,290. Patented Nov. 26, 1901.
W. TRAFFORD.
DISTANCE REGISTERING AND TIME RECORDING INSTRUMENT.
(Application filed Nov. 23, 1895. Renewed Apr. 27, 1901.)
(No Model.) 2 Sheets—Sheet 2.

UNITED STATES PATENT OFFICE.

WESLEY TRAFFORD, OF NEW YORK, N. Y.

DISTANCE-REGISTERING AND TIME-RECORDING INSTRUMENT.

SPECIFICATION forming part of Letters Patent No. 687,290, dated November 26, 1901.

Application filed November 23, 1895. Renewed April 27, 1901. Serial No. 57,811. (No model.)

*To all whom it may concern:*

Be it known that I, WESLEY TRAFFORD, a citizen of the United States, residing at New York, county of New York, and State of New York, have invented certain new and useful Improvements in Distance-Registering and Time-Recording Instruments, fully described and represented in the following specification and the accompanying drawings, forming a part of the same.

The object of this invention is to provide a simple and compact instrument within the confines of a single case for attachment to a vehicle that will enable one to readily observe at any moment not only the distance which a vehicle has traveled in miles and parts thereof, but note the time consumed in traveling any distance and continuously make a record thereof, so that the travel of said vehicle and the time consumed in the making of such distance and parts thereof shall be permanently recorded, and hence the speed of the vehicle during all periods of its travel shall be readily ascertainable.

The various features of invention will appear in the course of the description of the construction and operation of the apparatus and finally be pointed out in the claims.

Practical embodiments of the invention are shown in the accompanying drawings, in which—

Figure 10:
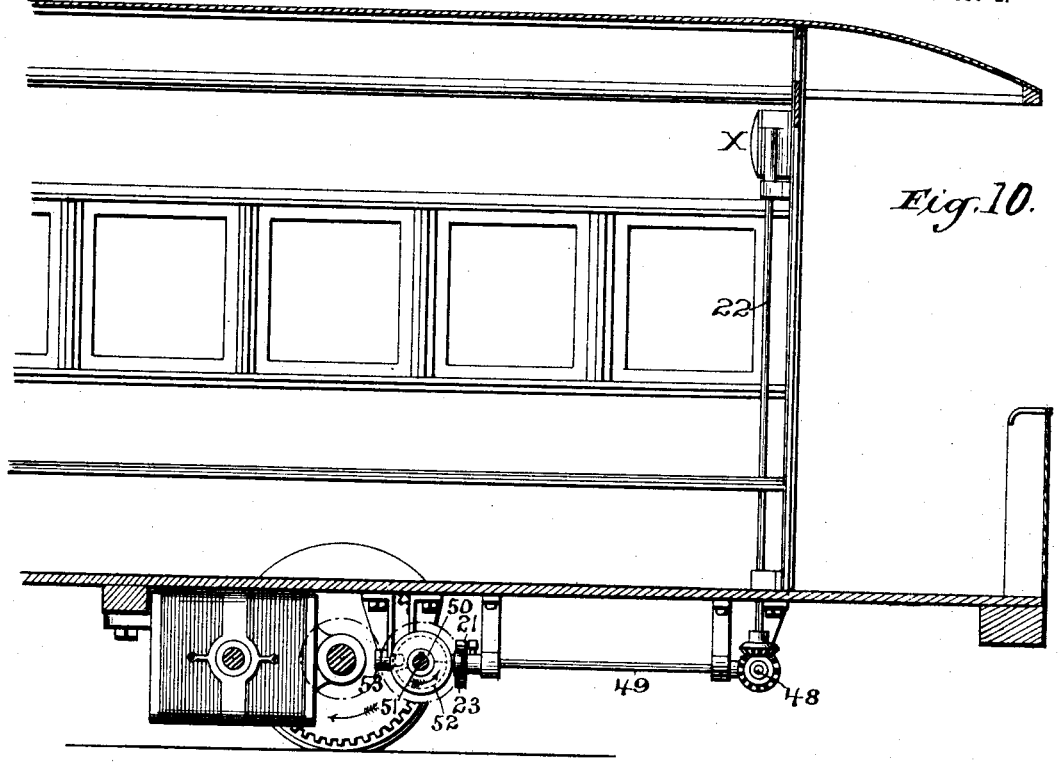

Figure 1 is a side elevation of the forward portion of a bicycle having attached thereto the said register and recorder. Fig. 2 is a front elevation thereof. Fig. 3 is a facial view of the instrument. Fig. 4 is a sectional elevation thereof on the line 4 4 of Figs. 3 and 5. Fig. 5 is a sectional view thereof on the section-line 5 5 of Fig. 4, the parts in front being removed to expose those in the rear of the dial. Fig. 6 is a rear elevation thereof on the section-line 6 6 of Fig. 4 with the back cap removed, showing the recording-dial and means for marking the same. Fig. 7 is a like view, taken on the section-line 7 7 of Fig. 4, with parts removed to show more particularly the tripping mechanism. Fig. 8 is a side elevation, the casing being broken away, showing more particularly the parts illustrated in Fig. 7, being the tripping mechanism in elevation. Fig. 9 is a sectional elevation of the puncturing or marking mechanism. Fig. 9$^a$ is a detail of a portion of the registering mechanism. Fig. 10 is a side elevation; and Fig. 11, a bottom plan view of an adaptation of the instrument to a tram-car, the car-body being omitted.

In carrying this invention into practice any ordinary time mechanism, as a clock or watch, and any of the various forms of odometer are made use of, together with instrumentalities combined therewith, to accomplish their coactive combination in attaining the objects of this invention. With respect to the time mechanism it is only necessary, therefore, to point out herein such parts thereof as are necessary to an understanding of this instrument. Thus the minute-carrying shaft $a$ is the ordinary one used for that purpose and driven in the ordinary way. Herein, however, it is extended rearwardly, as appears in Fig. 4, so that it may carry the paper recording-disk 10, it being provided for this purpose with a metal supporting-disk 11, fast thereto and provided with a number of short pins 12 for securing the paper recording-disk 10 fixedly thereto, said paper disk being held in place by means of a cap-plate 13, secured in place by its spring clamping action provided by slitting it, as at 14, this recording-disk thus being rotated concertedly with the minute-hand of the time apparatus. The hour-hand of the time apparatus is propelled by the sleeve $e$, encircling the shaft $a$, by means of the ordinary mechanism therefor.

The primary registering devices of the odometer consist of an indicator-dial I, graduated in the instance illustrated to hundredths of a mile, with which registers a pointer 1, carried by a rotative toothed-rim wheel D. The secondary registering devices of the odometer consist of numbered disks $u$ $v$ $w$, the primary or units disk $u$ of which is tripped one notch at each rotation of the toothed-rim wheel D, so as to expose single consecutive numbers at the orifice $x$ through the dial by means of a star-wheel $s$, (see Fig. 9$^a$,) carried at the rear of the disk $u$, fixed to its shaft, the points of which star-wheel correspond in number with the figures upon the dial I, and which star-wheel is engaged and moved with a step-like action, so as to expose consecutive and single figures through the opening $x$ in the dial by means of a tappet $t$, attached to the toothed rim D or to the stud of the pointer 1. The star-wheel at the back of this units-disk $u$ carries a pin $p$, as shown in Fig. 9ª, which engages once during each revolution a star-wheel carried at the back of the disk $v$, and the disk $v$ is similarly provided with a pin $p'$, that engages a star-wheel carried at the back of the disk $w$, the action being such that at each revolution of the units-disk $u$ the disk $v$, indicating tens, will be moved one notch to expose consecutive figures, and the disk $v$ will similarly operate at each of its revolutions to expose one of the figures in the hundreds-disks $w$, in like manner as is common in numbering-machines. The toothed perimeter of the rim-wheel D is engaged by the worm 20 and is rotated as said worm is rotated. The means for rotating this worm is, as shown in Sheet 1, a star-wheel 21, carried by a shaft 22, and so located with respect to the wheel W that a tappet 23, carried thereby, shall at each revolution of the wheel W cause the star-wheel to make a partial rotation, which rotative movement through the shaft 22 will by means of suitable gearing rotate the shaft of the worm-wheel 20 a corresponding distance, and this in turn will move the rim-wheel D rotatively onward a suitable distance, the arrangement of gearing being such that repeated rotations of the wheel W, corresponding with a fixed distance traveled—in the example, hundredths of a mile—will in thus traveling move the index 1 to register the same on the dial I, while at each rotation of the rim-wheel D the tappet it carries, as the shank of pointer 1, will engage the actuating star-wheel of disk $u$, and thus rotate said disk one step, each mile traveled being indicated by the exposure of a suitable number at the opening $x$ of the face-dial I, and successive miles thus registered being correspondingly indicated by the units, tens, and hundreds disks, so that the actual distance traveled will be indicated by the numbers exposed through the openings $x\,y\,z$ in said face-dial and hundredth fractions thereof by the pointer 1. In order to permanently record the distance thus traveled by the wheel W, the toothed-rim wheel D is provided on its face with a succession of tappets 8, projecting therefrom and arranged at such equidistant points as to record divisions of a mile, as eighths, which tappets operate the recording instrumentalities. These consist of a bell-crank lever 3 4, pivoted on a shaft 30 and so spring-controlled that its short arm 3 shall normally be pressed inward, limited by the edge of the opening in the case acting as a stop in proper position for the tappets 8 to contact with them and recover that position after being tripped, the long arm 4 of which bell-crank lever is thus positioned to act upon the long arm 5 of another bell-crank lever $i$, which lever is pivoted on a vertical shaft 6 and provided with a light spring encircling its pivot-shaft, which spring presses its long arm 5 lightly against the long arm 4, (see Fig. 8,) the short arm 7 of this lever $i$ (see Fig. 6) in turn bearing against the spring-arm 15, which carries a puncturing-pin 9, (see Fig. 9,) by which the paper recording-disk is punctured appropriately.

The paper recording-disk 10, which rotates with the minute-hand shaft, is graduated radially by means of lines corresponding with the minute divisions on the time-indicating dial I, and it moves between a bearing-plate 16 and a guard 17, which plate and guard each have an arc-like slot to admit the passage of the pin 9 in all of its positions of adjustment to and from the outer edge of the disk. In order that the paper disk 10 may contain record of a large number of miles, the puncturing-lever 15 is arranged to operate on a serpentine line, so as to completely fill the disk. At each rotation, therefore, of the disk 10 said puncturing-lever must be moved inwardly to a proper position to accomplish this result. Said lever 15 is maintained in its outward position by its guard 17 and is provided with a rock-arm 18, that is borne upon by a cam-disk 19, (see Fig. 7,) which cam-disk by suitable gearing connecting it therewith is operated from the gearing constituting the time-measuring mechanism and makes a complete rotation during each hour, thus progressively moving the perforating-lever inwardly, so that its recorded perforations will have a spiral course, and thus be distinct to the eye.

Figure 11:
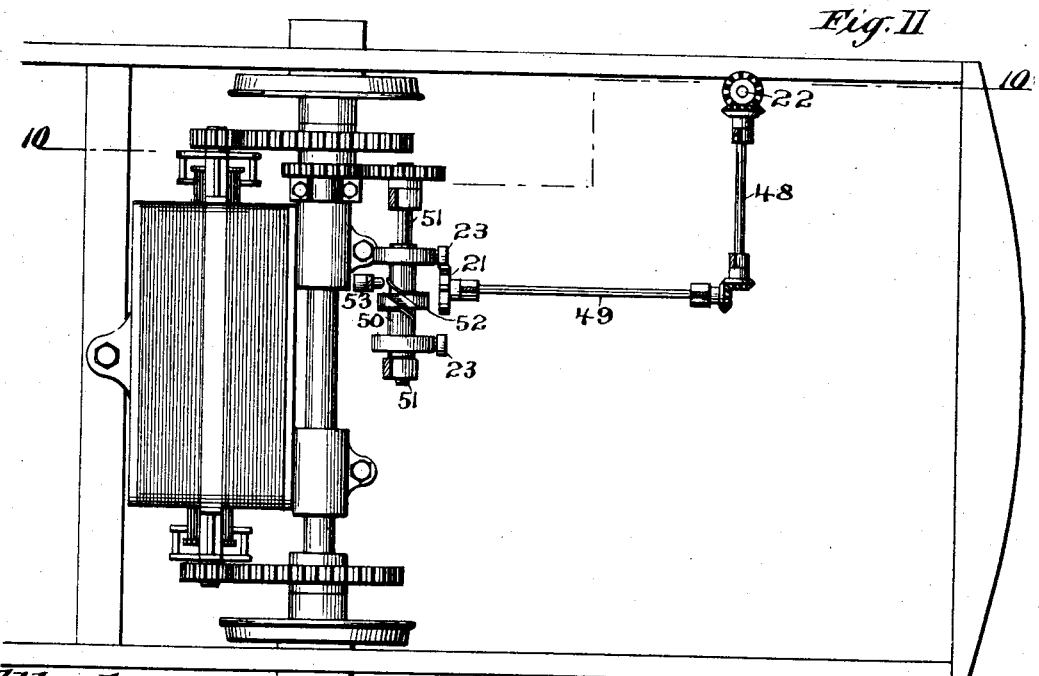

This instrument is mounted upon a wheeled vehicle, with its star-wheel 21 so related to a wheel of the vehicle as to be rotated with a step-like action thereby, and thus turn the shaft 22, which through the gearing described will operate the worm 20, thus causing the toothed rim D to be rotated at such speed as to cause the pointer 1 to register the parts of a mile traveled and the numbered disks $u\,v\,w$ to register the number of miles traveled, and this distance traveled will be recorded on the paper disk 10, each record-dot denoting an eighth of a mile or any other desired division, according as the toothed wheel D is provided with tappets 8, which tappet having moved to trip the arm 3 of the bell-crank will cause its arm 4 to vibrate the bell-crank having the arms 5 7, which latter, pressing inwardly the pin carrying lever 15, cause the pin 9 to perforate the disk 10 appropriately—that is, at whatever point that disk is to be moved by the time mechanism—thus recording the eighths of a mile on said disk in position to indicate the time consumed in making the course traveled. The time mechanism is additionally made use of to indicate time by supplying it with a time-registering dial and suitable pointers, as shown in Fig. 3. A permanent record is thus obtained, showing not only the whole distance traveled in a given time, but any variation in the speed with which the course is made at any division of said entire time, and is thus of great utility as a time-register and distance-recorder for various vehicles, and more particularly for trolley-cars, where the speed consumed in making a certain distance on the road of travel is fixed by law. The rod 22 is made extensible, so as to carry the star-wheel 21 near the axle of the wheel, as shown by lapped joints, and the tappet 23 is constructed so that it may be adjusted to any desired position with respect to said axle and so that the two may coöperate in any position distant from the axle and between it and the tire of the wheel, which arrangement or modification thereof will also enable the recording instrument to be placed in any desired position with respect to the guiding-lever of a cycle. By applying this instrument thereto, as shown in Figs. 10 and 11, the instrument is preferably mounted so as to expose its time-dial within the car, as indicated at X, Fig. 10, and have its registering-disk visible or capable of examination from the outside or platform of the car. The operating-rod 22, which drives the worm 20, is shown as projecting beneath the car-body and extended to near the axle of the forward wheels by counter-shafts 48 49 and suitable bevel-bearing, thus supporting the operating star-wheel 21 within the range of action of a tappet 23, which in this instance is duplicated at the opposite ends of a reciprocating sleeve 50, that is splined upon a shaft 51, that is driven by gears from the wheel-shaft, so that it will make turn for turn therewith, and thus at each rotation said tappet will move the star-wheel one step. The tappets 23, projecting from this sleeve 50, are separated a sufficient distance apart to permit the carriage and operation between them of a cam 52, fixed upon said sleeve 50. When the vehicle is run in a forward direction, this cam 52 will by means of the shifting lever 53, which it engages upon making such forward movement, cause the sleeve 51 to slide laterally sufficiently to bring and maintain the tappet 23 within the range of action of the star-wheel 21 on one side thereof, as in Fig. 11, and when the vehicle is run in an opposite direction said cam-wheel will in coaction with the said lever 52 shift the sleeve 51 in the contrary direction, so as to bring the tappet 23, idly moving in Fig. 11, into a position to be within the range of action of said star-wheel 21 on its opposite side, so that said star-wheel is turned in the same direction no matter which way the car is traveling, and thus always operates the worm 20 appropriately to operate the recording instrument.

What is claimed is—

1. The combination with the rim-wheel D and its tappets 8 rotating about a common shaft, and a rotative register-disk carrier rotated by said shaft, of a tripping-arm 3, a perforating-lever 15, and devices intermediate thereof transmitting the movements of the arm 3 to the lever 15 to cause the puncturing of said disk, substantially as described.

2. The combination with the rim-wheel D, and its tappets 8 rotating about a common shaft, means for rotating said rim-wheel from the vehicle, a register-disk carrier rotated by said shaft, a tripping-arm 3 and means connecting the same with a tripping-arm 7, of the spring-seated pin carrying lever 15 and a supporting-plate 16 whereby the register-disk is perforated, substantially as described.

3. The combination with the rim-wheel D and its tappets 8 rotating about a common shaft, means for rotating said rim-wheel from the vehicle, a register-disk carrier rotated by said shaft, a tripping-arm 3 and means connecting the same with a tripping-arm 7, of the spring-seated pin carrying lever 15, a supporting-plate 16, and guard 17 whereby the register-disk is perforated, and springs bearing upon such of said connecting means as to cause or admit the retraction of the pin carried by lever 15 to its normal position thus instantly freeing the disk 10 from the pin so that said traveling disk may constantly move without injury, substantially as described.

4. The combination with the disk-supporter rotated by the time mechanism, a vibrating puncturing-lever 15 actuated by the tappets 8, a bearing-plate 16, a guard 17, said plate and guard each being provided with a curved slot for the traverse of the puncturing-pin 9, and means for progressively swinging said lever and its pin 9 in said slots, substantially as described.

5. The combination with the worm-actuating shaft 22 and its star-wheel 21, of tappets 23, 23 carried by a sleeve splined on a shaft driven from the axle of a vehicle, of the cam 52 and a shifting lever 53 whereby the recording instrument is operated by the travel of the vehicle in opposite directions, substantially as described.

In testimony whereof I have hereunto set my hand in the presence of two subscribing witnesses.

WESLEY TRAFFORD.

Witnesses:
H. T. MUNSON,
T. F. KEHOE.